UNITED STATES PATENT OFFICE.

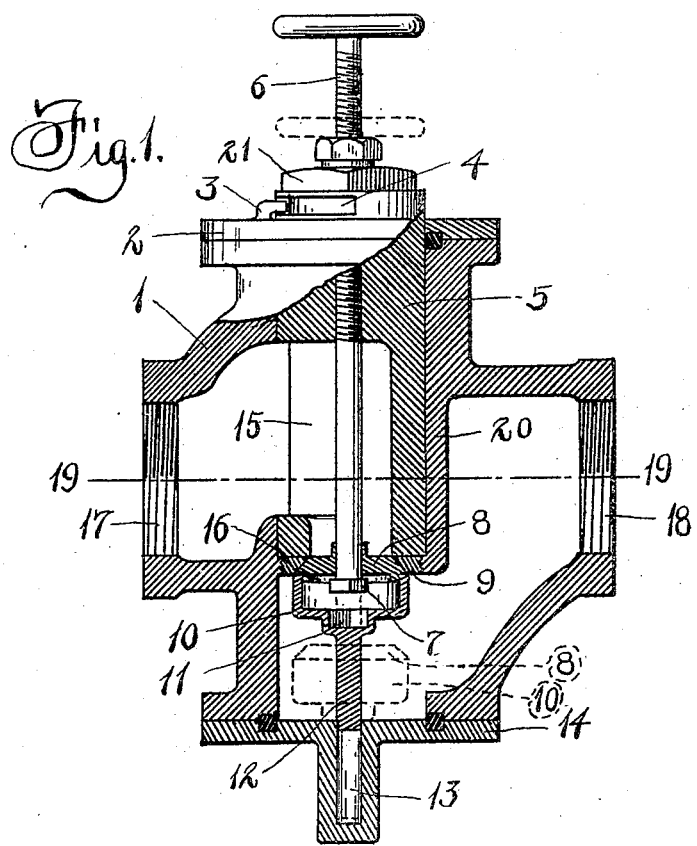
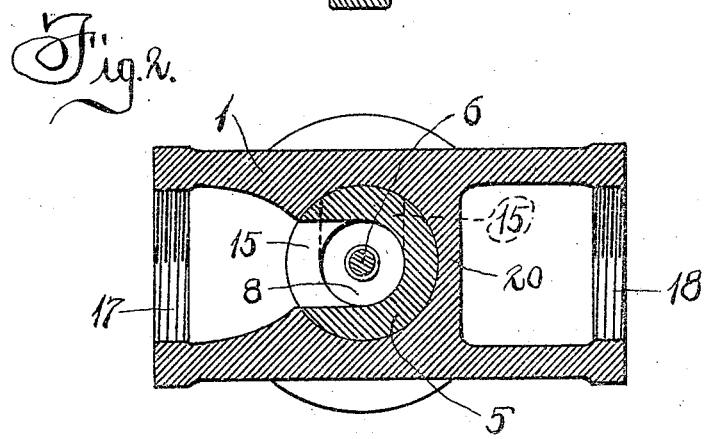

JOHN B. YOUNGBLOOD, OF CLEVELAND, OHIO.

BLOW-OFF COCK.

943,056.

Specification of Letters Patent.   Patented Dec. 14, 1909.

Application filed March 30, 1909.   Serial No. 486,648.

*To all whom it may concern:*

Be it known that I, JOHN B. YOUNGBLOOD, a citizen of the United States, residing at Cleveland, in the county of Cuyahoga and State of Ohio, have invented certain new and useful Improvements in Blow-Off Cocks, of which the following is a specification.

My invention relates to valves, and more particularly to those valves termed blow-off cocks, and the object is to provide an improved blow-off cock in general, and one embodying a novel pressure seated self-grinding valve.

In the accompanying drawings, which illustrate my invention, and form a part of this specification, Figure 1 is a vertical sectional view through my improved blow-off cock, and Fig. 2 is a horizontal sectional view taken therethrough on the line 19—19 of Fig. 1.

In the embodiment of my invention, as shown, I provide a valve casing 1, comprising an inlet 18, and an outlet 17, and having a diaphragm 20 between said inlet and outlet, and a flange plate 2, at the upper end of its valve bore, said plate 2, having an upwardly and inwardly projecting finger 3, engaging within a curved slot 4, in the periphery of the plug 5, adjacent its upper end, provided with a nut 21, by which it may be turned. The diaphragm 20, has a threaded opening in its horizontal portion in which is screwed a removable valve seat 9, against which a valve disk 8, seats upwardly, and downwardly upon which the lower end of plug 5, extends, said plug having a central bore, cored out from its lower end, and an opening 15, through its wall communicating with said bore, and through the same, with the inlet side of the diaphragm 20, when disk 8 is unseated.

The disk 8, has an annular threaded flange upon its lower face, by which it may be screwed within the cup-shaped head 10, of a depending guide stem 12, extending into a tubular extension 13, of casing 1, said cup-shaped head having a central squared recess 11, in its base. The valve stem 6, is threaded through the upper end of the plug 5, and extends loosely through valve disk 8, and is provided with a square head 7, within the cup-shaped member 10. Thus the valve, comprising disk 8, and the cup-shaped member 10, is a buoyant one, and will be held seated by the boiler pressure through inlet 18, plug 5, when turned to the dotted position in Fig. 2, assuring a perfectly tight closure. By opening plug 5, and screwing disk 8, downwardly, the boiler may blow-off through 17, also water may be supplied to the boiler through 17, when plug 5, and disk 8, are open, the water forcing disk 8, down when the stem head 7, is lowered in the cup-shaped member 10, and any back pressure closing the same. Further, by the construction described, the disk 8, will be ground against its seat each time the same is opened, inasmuch as head 7, of stem 6, will engage within the recess 11, of member 10, and rotate the said disk several times before pushing the same from its seat. However, to satisfactorily re-grind the valve upon its seat without danger of defacing it, or the seat, I prefer to close plug 5, when there is no pressure from the boiler, the buoyancy of the valve being the only thing which holds it against its seat.

Having thus described my invention, what I claim is:

1. In a device of the character described, the combination of an upwardly seating buoyant valve, and a stem controlling the same having longitudinal movement with relation thereto, and means relatively engaging between said valve and said stem to rotate the former before movement thereof away from its seat.

2. In a device of the character described, the combination of a casing having a diaphragm forming a horizontal valve seat, a plug extending downwardly against said seat having a central bore and an opening through its wall communicating with said bore and provided with means upon its upper outer end to control rotative movement thereof, a valve seated upwardly against said valve seat, a stem for controlling said valve, longitudinally movable with relation thereto, and relatively engaging means carried by said stem and said valve for rotating the latter upon its seat.

3. In a valve of the character described, the combination of a diaphragm embodying a valve seat, a valve disk for engagement upwardly against said seat, a cup-shaped member upon which said disk is secured to form a buoyant valve, a rotatable stem projecting centrally downwardly through said disk, and relatively engaging projections and recesses carried by said stem and the base of said cup-shaped member whereby to cause several rotations of said disk against said seat before moving therefrom.

4. A blow off cock comprising a casing having an inlet and an outlet and a diaphragm forming a valve seat, a plug extending downwardly upon said diaphragm, having a central bore and an opening through its wall communicating with said bore, and having external means for rotating the same, a buoyant check valve adapted to seat upwardly against said diaphragm, and a valve stem controlling said check having means to grind the same upon its seat.

In testimony whereof I affix my signature, in presence of two witnesses.

JOHN B. YOUNGBLOOD.

Witnesses:
RODERICK J. BISSETT,
JOHN A. BOMMHARDT.